United States Patent Office 2,979,416
Patented Apr. 11, 1961

2,979,416
METHOD FOR SEALING ERODED ARTICLES AND THIXOTROPIC COMPOSITION THEREFOR

Stanley Drexler, Pensauken, N.J., assignor to Magna-Bond, Inc., Camden, N.J., a corporation of New Jersey No Drawing. Filed Apr. 29, 1958, Ser. No. 731,613

7 Claims. (Cl. 117—2)

My invention relates to a method for sealing eroded articles and composition therefor, and more particularly relates to a method and composition for sealing, filling, and restoring metal, wood, concrete, paint and plastic surfaces especially window sills and sashes, repairing pipe lines, ducts and pressure tanks, lining water and petroleum tanks, sealing seam and rivet leaks and holes in storage tanks, and generally providing corrosion and moisture proofing and increasing abrasion resistance to any surface.

My composition encompasses the use of minute particles of aluminum which are completely enveloped with a coating of vinyl, whereby the aluminum particles are completely bonded and combined to provide the high resistance of plastic materials with the metallic properties of aluminum to produce a hard, metallic-like, non-permeable film, possessing excellent physical and chemical properties, in combination with high specific adhesion to any clean porous or non-porous surface. It is with particular reference to brush and spray applications that my composition is concerned although with slight variations in the formulation the composition can be easily troweled upon a surface in the manner of a putty. My coating composition may be flowed on, brushed on, or sprayed on to provide and insure a continuous film completely without brush or lap marks when dry. The utility of my composition resides in the thixotropic effect of colloidal materials becoming stiff and jelly-like when at rest, but becoming fluid when agitated, or otherwise subjected to stress, or allowed to have the solvents therein evaporate.

In the past metallic vinyl paints and liquid solders had been employed but were of such a viscosity as to preclude brush application. Prior art compositions utilized nitro cellulose and leaf aluminum in a solvent of amyl acetate which left a porous film or mass after putty application because of the rapidity of evaporation of the amyl acetate. Such prior art films and dried masses necessarily required considerable buffing and polishing after application because of the porous nature of the surface when the film was dry. Furthermore, poor adhesion and lack of flowing characteristics were exhibited by the prior art compositions which precluded their application upon very porous surfaces such as wood or concete.

It is therefore an object of my invention to provide a method for sealing and filling eroded surfaces and composition therefor wherein a coating may be applied to provide a smooth continuous film without lap or brush marks.

Another object of my invention is to provide a composition for filling, sealing and restoring eroded surfaces by brush, roller, spray, or flow-on application.

Another object of my invention is to provide a composition for filling, sealing, and restoring eroded surfaces wherein the applied film will be resistant to water, chemical, grease, oil, gasoline, weather, heat, corrosion and moisture.

Another object of my invention is to provide a composition for restoring eroded surfaces wherein the applied film will adhere to the surface and be resistant to abrasion and impact thereupon.

Another object of my invention is to provide a method for restoration of rotted wooden surfaces and planks such as window sills and posts which are subject to attack by weather, moisture, and fungus.

Another object of my invention is to provide a composition for restoration of eroded surfaces wherein the applied film will have color and gloss retention without polishing or buffing.

Another object of my invention is to provide a composition for the restoration of eroded surfaces wherein the coating may be rapidly dried to provide a continuous film by brush, roller, spray, or trowel without leaving any brush or lap marks or requiring polishing or buffing after the film has dried.

Another object of my invention is to provide a composition for decorating and water proofing concrete, masonry and cinder block.

Another object of my invention is to provide a method and composition for closing the surface pores of materials such as concrete, masonry, cinder block, and wood.

Another object of my invention is to provide a composition which will exhibit excellent adhesion upon painted surfaces.

Another object of my invention is to provide a method and composition for producing a film which will withstand temperatures up to 300 degrees F., which is non-toxic, non-flammable, possesses high specific adhesion and hardness in combination with flexibility, and which is unaffected by the destructive action of sunlight, outdoor exposure, chemicals, and aliphatic hydrocarbons.

Other objects of my invention are to provide an improved method and composition of the character described, that is easily and economically produced, which is sturdy in construction and which is highly efficient in operation.

Referring now to specific embodiments of my invention, I show the following examples which are illustrative of the preparation of various applications of my compositions.

*Example 1*

| Material | Function | Percent By Weight |
|---|---|---|
| Xylene | Diluent | 11.40 |
| Methyl Isobutyl Ketone | Solvent | 13.00 |
| Ethyl Amyl Ketone | do | 6.50 |
| Polyester Resin or Epoxy Resin | Plasticizer | 1.63 |
| VMCH | Resin | 8.15 |
| VAGH | do | 3.26 |
| VYLF | do | 4.06 |
| Syloid | Suspending Agent | 0.80 |
| Atomized Aluminum Powder | Filler | 51.20 |
|  |  | 100.00 |

|  | Percent |
|---|---|
| Total solids | 69.10 |
| Volatiles | 30.90 |
|  | 100.00 |

VMCH is a copolymerized vinyl resin composition containing, as initial reactants, by weight 86% vinyl chloride, 13% vinyl acetate, and 1% interpolymerized dibasic acid, said copolymerized resin (0.7 to 0.8 carboxyl) such as maleic acid having a specific gravity 1.35 and intrinsic viscosity 0.53 (cyclohexanone at 20° C.).

VAGH is a copolymerized vinyl resin composition containing, as initial reactants, 91% vinyl chloride, and 9% polyvinyl acetate, said copolymerized resin having a specific gravity 1.39 and intrinsic viscosity 0.57 (cyclohexanone at 20° C.).

VYLF is a copolymerized vinyl resin composition containing, as initial reactants, 87% vinyl chloride and 13% vinyl acetate, said copolymerized resin having a specific gravity 1.34 and intrinsic viscosity 0.24 (cyclohexanone at 20° C.).

Syloid is a submicroscopic particulate colloidal silica prepared by the vapor phase hydrolysis of a silicon compound and having the following chemical and physical properties.

| | |
|---|---|
| Silica content (moisture-free basis) | 99.0–99.7%. |
| Free moisture (105° C.) | 0.2–2.0%. |
| Ignition loss (1,000° C.) | 0.2–1.0% |
| CaO, MgO | 0.00%. |
| Fe₂O₃ | 0.004%. |
| Particle size range | 0.015–0.020 micron. |
| Surface area (nitrogen adsorption) | 175–200 sq. meters/gm. |
| Specific gravity | 2.1. |
| Color | White. |
| Refractive index | 1.55. |
| pH (10% aqueous dispersion) | 4.5–6.0. |
| Oil absorption (Gardner method) | 150 lbs. oil/100 lbs. pigment. |
| Bulking value | 0.057 gal./lb. |
| Apparent bulk density: | |
| Uncompressed grade | 2.5–3.5 lbs./cubic ft. |
| Compressed grade | 6.0–6.5 lbs./cubic ft. |

The silica tends to swell in certain phases and prevents the pigments and fillers from settling.

The plasticizer may be of a type commonly referred to by those skilled in the art as a high molecular weight polyester resin (i.e. polymeric reaction products of polyhydric alcohols and long chain polybasic acid) such as, for example, the material sold under the trademark Paraplex G–62 which has the following properties:

| | |
|---|---|
| Average molecular weight number | 1000 |
| Color (Gardner Varnish Scale) | 2 (max.) |
| Specific gravity (25° C./15° C.) | 0.999 |
| Pounds per gallon | 8.3 |
| Viscosity (Poise S, 25° C.) | 3 to 4 |
| Refractive index ($N_D^{25°}$) | 1.471 |
| Freezing Point (° C.) | +2 |
| Flash point (° C.) | 316 |
| Acid number (MGM.KOH/gm.) | 1 (max.) |
| Saponification number (MGM.KOH/gm.) | 182 |

The plasticizer may also be an epoxidized fatty acid containing material such as, for example, the epoxidized soybean oil sold under the trademark Admex and described in Technical Bulletin #101 (published by Archer Daniels Midland Co., May 1953).

The atomized aluminum powder is a blend of aluminum fine size particles 325–375 mesh. The composition may contain up to 40% colloidal silica having pH 5–7. Either Reynolds No. 1–511 or Alcoa 123 may be utilized for this purpose.

I prepare the above formulation in the following manner:

(1) Add xylene, methyl isobutyl ketone and the polyester resin together and blend in a mixing vat at room temperature.

(2) Using a Cowles dissolver with knife edges shear the polyester resin into solution.

(3) Shake in the VMCH, VAGH, and VYLF resins.

(4) Add in the Syloid slowly.

(5) Propylene oxide 0.05 to 0.10% may be added to act as a stabilizer. If propylene is added it is mixed and blended for 20 minutes in the Cowles dissolver.

(6) Slowly add the atomized aluminum powder to the remainder of the mixed constituents and blend in for 10 to 15 minutes.

(7) The thixotropic effect permits gravity filling of the containers from the bottom of the mixing vat or dissolver.

The above formulation is for heavy brush application or trowel technique wherein the composition is flowed on for the repairing and restoring of eroded window sills or to seal leaks in metal storage vats or to fill holes and cracks in concrete, cinder block, or other masonry structures. The application can be made in any outdoor or indoor temperature. The surface to be coated is first sandblasted or the loose paint and rust scale removed with a wire brush. Aromatic or aliphatic naphtha is used to remove oil and grease films.

Spray applications are accomplished by first diluting the formulation set forth in Example 1 with a blend of aromatic hydrocarbon such as xylene and ketones such as methyl isobutyl ketone with a ratio depending on the pressures and type of equipment available. When employing DeVilbiss pressure-type equipment, use FX or E fluid tip and a #765 or #222 aircap. In Binks equipment a 63–PB aircap nozzle combination is utilized. Overspray can be minimized when using an internal-mix aircap and this type of spray is recommended where a smooth finish is desired.

For equipment with external-mix aircap, use a 30 p.s.i. fluid pressure and 45–50 p.s.i. atomization pressure. Internal-mix aircaps will require both fluid and atomization pressures held at 35 p.s.i. Spray by using a slow pass and each pass should be overlapped with three-fourths of the next pass. This pattern will produce a dry film thickness of 1½ to 2 mils per application.

Using the diluted formulation and a soft, long, bristle brush, the application may also be by an enamel technique wherein a full, wet brush is stroked in a criss-cross fashion and ending in a vertical or parallel line parallel to the grain. The coating composition is flowed on and brushed out as little as possible. Each brush application produces approximately one and one half mils of dry film thickness. At least three coats are applied to obtain over four mils for adequate permanent protection. Successful applications can be made within five to ten minutes depending on temperature conditions. Cross brush each application to insure a continuous film.

Each film is permitted to air dry and no polishing or buffing is required after the film has set. There will be no flow marks or brush marks or pin holes after the coatings have been applied.

The setting of the film is dependent upon evaporation of the diluents and solvents and the vapor pressure relationship of the solvents and diluents utilized. The methyl isobutyl ketone is first evaporated from the applied wet coating. The vapor pressure of xylene is approximately that of water and the xylene will pass into the vapor phase after the methyl isobutyl ketone. The ethyl amyl ketone is a residual solvent but is not permanent. The polyester resin does not evaporate but remains in the dry film as a permanent solvent.

The Syloid tends to swell while in colloidal suspension and retards the pigments from settling out thereby maintaining them in a colloidal state. Thus the property of the composition is that of a colloidal gel wherein its constituents are thixotropic since the gel coagulates and becomes stiff and jelly-like when at rest but remains fluid when agitated or otherwise subjected to stress prior to the evaporation of the diluents and solvents therein. This thixotropic effect precludes flow marks, lap marks, and brush marks during application since the composition when application is made as a coating by brush, spray or trowel, is initially agitated as a result of application. Thereafter the gel flows until it becomes stiff as a result of evaporation of the diluents and solvents.

*Example 2*

| Material: | Percent by weight |
|---|---|
| Xylene | 15.0 to 11.6 |
| Methyl isobutyl ketone | 16.3 to 12.9 |
| Ethyl amyl ketone | 12.0 to 6.8 |
| Syloid | 2.0 to 0.1 |
| Polyester | 1.6 to 3.0 |
| VYLF | 4.3 to 10.0 |
| VAGH | 3.2 to 10.0 |
| VMCH | 5.0 to 15.0 |
| Propylene oxide | 0.1 to 0.05 |
| Aluminum powder | 30.0 to 60.0 |

It is to be observed that increasing the percentage of aluminum powder and at the same time increasing the resin and stabilizer content and decreasing the solvent-diluent concentration will increase the viscosity of the composition and transform the jell into a putty. The putty may be applied by trowel, knife and/or caulking techniques whereby a crack or hole is completely filled by an application of the metallic vinyl putty. Larger holes and cracks should be abridged with a wire screen, glass cloth or a piece of canvas impregnated with a brush type metallic vinyl composition such as shown in Example 1. Although it is not necessary to polish or grind or buff the putty application, it may be done when dried so that it may be sanded or filed to a feathered edge whereby an application of the brush type composition as set forth in Example 1 may be coated thereover.

Correspondingly, decreasing the aluminum powder concentration together with the resin and stabilizer phase and increasing the solvent diluent phase transforms the composition into a brush or spray type coating.

The formulation set forth above may be further modified as follows:

Diluents may be any aromatic hydrocarbon or aromatic naphtha having 80% or more aromatic content.

The solvent may be substituted as methyl ethyl ketone, methyl amyl ketone, ethyl Cellosolve or butyl Cellosolve. Plasticizers may be any high molecular weight polyester which combines good permanent or non-migratory properties, marked stabilization, and retention of compatibility on aging together with good solubility in the solvents and diluents, binding resins set forth and miscible therewith.

Fillers or pigments may utilize strainless steel which is finely ground, highly particulated glass powders, cork and wood flour or any metal particle having strength and flexibility in colloidal suspension.

It is to be observed that the application of the putty compound or spray compound is substantially similar to the application set forth in Example 1, the only difference being utilization of a trowel or spray gun respectively rather than a brush.

The physical properties of my composition are high impact resistance, great flexibility which will expand and contact with the surface to which it is applied, high specific adhesion and cohesion, high abrasion resistance, ability to be worked like metal enabling machining, sanding, grinding, tapping and drilling, will not conduct electricity, will withstand high temperature up to 300° F. and will not rust or oxidize. The composition produces a hard metallic-like non-permeable film which is resistant to water and moisture, on petroleum products, soaps and detergents, fatty acids, mineral acids and alkali, sunlight and weathering and most chemicals.

The composition may be used for filling wood, metal and concrete; permanently sealing seam and rivet leaks and holes in storage tanks; repairing pipe lines, ducts and pressure tanks; repairing window sills and sashes; lining water and petroleum tanks and general purpose maintenance coating, decorating and water proofing concrete, masonry and cinder block.

Although my invention has been described in considerable detail, such description is intended as being illustrative, rather than limiting, since the invention may be variously embodied, and the scope of the invention is to be determined as claimed.

I claim:

1. A thixotropic composition for sealing eroded surfaces comprising colloidal silica; a highly particulated powder selected from the group consisting of atomized metal, glass, wood and cork; a copolymerized vinyl chloride-vinyl acetate resin binder; a plasticizer selected from the group consisting of high molecular weight polyester resins and epoxidized soybean oil; two organic liquid solvents for said copolymerized vinyl resin, one having a vapor pressure substantially higher than that of water, the other having a vapor pressure substantially lower than that of water; and an organic liquid diluent having a vapor pressure substantially equal to that of water.

2. The composition of claim 1 wherein said solvents are methyl isobutyl ketone and ethyl amyl ketone and, wherein further, said diluent is xylene.

3. A method for restoring eroded surfaces comprising the steps of preparing a blend of liquid organic solvents and diluents including a solvent having a vapor pressure substantially higher than that of water, a solvent having a vapor pressure substantially lower than that of water, and a diluent having a vapor pressure substantially equal to that of water; mixing with said blend a plasticizer selected from the group consisting of high molecular weight polyester resins and epoxidized soybean oil; adding a copolymerized vinyl chloride-vinyl acetate resin binder; adding colloidal silica to impart thixotropic characteristics; suspending a filler in the form of a highly particulated powder selected from the group consisting of atomized metal, glass, wood and cork; and applying the resultant composition to the eroded surface, thereafter allowing the composition to air dry at ambient temperature.

4. The method of claim 3 wherein the thixotropic composition is spray applied.

5. The method of claim 3 wherein the thixotropic composition is brush applied.

6. The method of claim 3 wherein the thixotropic composition is trowel applied.

7. The method of claim 3 wherein a plurality of coats of the thixotropic composition are applied with air drying at ambient temperature between coats.

References Cited in the file of this patent

UNITED STATES PATENTS

| | | |
|---|---|---|
| 2,319,852 | Doolittle | May 25, 1943 |
| 2,530,738 | Spessard | Nov. 21, 1950 |
| 2,610,958 | Norlander et al. | Sept. 16, 1952 |
| 2,610,960 | Nordlander | Sept. 16, 1952 |
| 2,631,137 | Loritsch et al. | Mar. 10, 1953 |
| 2,720,496 | Bushnell | Oct. 11, 1955 |
| 2,743,309 | Lindsay et al. | Apr. 24, 1956 |
| 2,770,606 | Teeters et al. | Nov. 13, 1956 |
| 2,792,376 | Binkley | May 14, 1957 |
| 2,808,342 | Nickerson | Oct. 1, 1957 |
| 2,833,737 | Mark et al. | May 6, 1958 |

OTHER REFERENCES

Colloid Chemistry, "Thixotropy," Alexander, vol. VI, Reinhold Pubs. Corp., 1946 (pp. 328–347 relied on).

Organic Protective Coatings, Von Fischer-Bobalek, Reinhold Pubs. Corp., 1953 (pp. 57–60 relied on).

Polyesters and Theor. Applications, Byorketen, Inc., Reinhold Pubs. Corp., 1956 (pp. 151–155 relied on).